(12) United States Patent
Hennemann et al.

(10) Patent No.: US 10,883,639 B2
(45) Date of Patent: Jan. 5, 2021

(54) MALE PUSH LOCK PIPE CONNECTION SYSTEM

(71) Applicant: Aqseptence Group, Inc., New Brighton, MN (US)

(72) Inventors: Thomas L. Hennemann, Cottage Grove, MN (US); Garth H. Saul, Faribault, MN (US)

(73) Assignee: Aqseptence Group, Inc., New Brighton, MN (US)

( * ) Notice: Subject to any disclaimer, the term of this patent is extended or adjusted under 35 U.S.C. 154(b) by 0 days.

(21) Appl. No.: 15/804,050

(22) Filed: Nov. 6, 2017

(65) Prior Publication Data

US 2018/0274706 A1 Sep. 27, 2018

Related U.S. Application Data

(63) Continuation of application No. 12/494,073, filed on Jun. 29, 2009, now Pat. No. 9,810,358, which is a
(Continued)

(51) Int. Cl.
*F16L 37/091* (2006.01)
*F16L 37/088* (2006.01)
(Continued)

(52) U.S. Cl.
CPC .......... *F16L 37/091* (2013.01); *F16L 37/088* (2013.01); *F16L 37/0842* (2013.01); *F16L 37/098* (2013.01)

(58) Field of Classification Search
CPC ... F16L 37/091; F16L 37/098; F16L 37/0842; F16L 37/088
See application file for complete search history.

(56) References Cited

U.S. PATENT DOCUMENTS

| 1,587,079 A | 6/1926 | Machino |
| 2,111,956 A | 3/1938 | Baldwin |

(Continued)

FOREIGN PATENT DOCUMENTS

| CH | 688 659 A5 | 12/1997 |
| DE | 24 40 886 A1 | 3/1976 |

(Continued)

OTHER PUBLICATIONS http://www.seatechinc.com/Technical/Product_Features, webpage printed Jan. 22, 2009.
(Continued)

*Primary Examiner* — Lawrence Averick
(74) *Attorney, Agent, or Firm* — Patterson Thuente Pedersen, P.A.

(57) ABSTRACT

A pipe for connecting to a similar adjacent pipe. The pipe has a male end with a plurality of rigid fingers extending from within and out of at least one exterior circumferential groove disposed on its exterior surface. On the female end is at least one interior circumferential groove sized and positioned to receive the plurality of rigid fingers from a corresponding exterior circumferential groove on the male end of an adjacent pipe. The number of exterior circumferential grooves on the male end typically corresponds to the number of interior circumferential grooves on the female end. When the male end of the pipe inserts into the female end of a similar adjacent pipe, the plurality of rigid fingers is received within a corresponding interior circumferential groove on the female end, thereby preventing the male end of the pipe from being withdrawn from the female end of the similar adjacent pipe.

13 Claims, 9 Drawing Sheets

Related U.S. Application Data continuation-in-part of application No. 12/365,000, filed on Feb. 3, 2009, now Pat. No. 8,342,579.

(51) Int. Cl.
*F16L 37/084* (2006.01)
*F16L 37/098* (2006.01)

(56) References Cited

U.S. PATENT DOCUMENTS

| | | | |
|---|---|---|---|
| 2,785,910 A | 3/1957 | Munger | |
| 3,272,538 A | 9/1966 | Bergstrom | |
| 3,389,923 A * | 6/1968 | Love, Jr. | F16L 37/088 285/321 |
| 3,413,021 A | 11/1968 | Pott | |
| 3,534,776 A | 10/1970 | Gilreath | |
| 3,744,824 A * | 7/1973 | Roos | F16L 37/0842 285/317 |
| 3,784,235 A | 1/1974 | Kessler | |
| 3,995,897 A | 12/1976 | Paskert | |
| 4,030,850 A | 6/1977 | Hyde | |
| 4,072,328 A | 2/1978 | Elliott | |
| 4,105,226 A | 8/1978 | Frey | |
| 4,128,264 A | 12/1978 | Oldford | |
| 4,191,384 A | 3/1980 | Svedberg | |
| 4,276,010 A | 6/1981 | Shartzer | |
| 4,471,978 A | 9/1984 | Kramer | |
| 4,490,576 A | 12/1984 | Bolante et al. | |
| 4,508,369 A | 4/1985 | Mode | |
| 4,587,713 A | 5/1986 | Goodman et al. | |
| 4,600,223 A | 7/1986 | de Vries | |
| 4,749,214 A | 6/1988 | Hoskins | |
| 4,779,902 A | 10/1988 | Lee | |
| 4,781,400 A | 11/1988 | Cunningham | |
| 4,854,397 A | 8/1989 | Warren | |
| 4,927,185 A | 5/1990 | McNaughton | |
| 4,962,579 A | 10/1990 | Meyer et al. | |
| 4,979,765 A | 12/1990 | Bartholomew | |
| 5,005,877 A | 4/1991 | Hayman | |
| 5,015,014 A | 5/1991 | Sweeney | |
| 5,119,892 A | 6/1992 | Clegg | |
| 5,219,188 A | 6/1993 | Abe | |
| 5,251,942 A | 10/1993 | Whaley | |
| 5,378,024 A | 1/1995 | Kumagai | |
| 5,533,761 A | 7/1996 | Ostrander | |
| 5,542,717 A | 8/1996 | Rea | |
| 5,580,100 A | 12/1996 | Umezawa | |
| 5,584,512 A | 12/1996 | Carstensen | |
| 5,662,360 A | 9/1997 | Guzowski | |
| 5,685,575 A | 11/1997 | Allread | |
| 5,716,081 A | 2/1998 | Leigh-Monstevens et al. | |
| 5,738,388 A | 4/1998 | Sundelin | |
| 5,826,921 A | 10/1998 | Woolley | |
| 5,845,945 A | 12/1998 | Carstensen | |
| 5,918,914 A | 7/1999 | Morris | |
| 5,964,709 A | 8/1999 | Morrison | |
| 5,971,445 A | 10/1999 | Norkey | |
| 5,975,591 A | 11/1999 | Guest | |
| 5,988,704 A | 11/1999 | Ryhman | |
| 5,988,705 A | 11/1999 | Norkey | |
| 6,062,326 A | 5/2000 | Strong | |
| 6,152,496 A | 11/2000 | Kouda | |
| 6,176,523 B1 | 1/2001 | Winslett | |
| 6,325,424 B1 | 12/2001 | Metcalfe et al. | |
| 6,343,814 B1 | 2/2002 | Bucher | |
| 6,401,820 B1 | 6/2002 | Kirk | |
| 6,464,024 B2 | 10/2002 | Beaton | |
| 6,499,771 B1 | 12/2002 | Snyder, Sr. et al. | |
| 6,568,658 B2 | 5/2003 | Strome | |
| 6,666,480 B2 | 12/2003 | Haney | |
| 6,688,655 B1 | 2/2004 | Watanabe | |
| 6,964,435 B2 | 11/2005 | Wolf | |
| 6,988,747 B2 | 1/2006 | Allen | |
| 7,029,035 B2 | 4/2006 | Seymour | |
| 7,097,211 B2 | 8/2006 | Adams | |
| 7,261,326 B2 | 8/2007 | Haney | |
| 7,264,281 B2 | 9/2007 | Le Quere | |
| 7,425,024 B2 | 9/2008 | Haney | |
| 7,445,247 B2 | 11/2008 | Erickson | |
| 7,445,250 B2 | 11/2008 | Swift | |
| 7,455,328 B2 | 11/2008 | Chelchowski | |
| 7,469,933 B2 | 12/2008 | Swift | |
| 7,470,383 B2 | 12/2008 | Haney | |
| 7,523,966 B2 | 4/2009 | O'Neill et al. | |
| 7,810,850 B2 | 10/2010 | O'Neill et al. | |
| 7,832,774 B2 | 11/2010 | Densel | |
| 7,841,630 B1 | 11/2010 | Auray et al. | |
| 7,875,714 B1 | 1/2011 | Chapman et al. | |
| 7,963,570 B2 | 6/2011 | Swift | |
| 2002/0017787 A1 | 2/2002 | Sakazaki | |
| 2003/0094813 A1 | 5/2003 | Bucher | |
| 2003/0116960 A1 | 6/2003 | Yates | |
| 2003/0122372 A1 | 7/2003 | Muto | |
| 2003/0155763 A1 | 8/2003 | Wolf et al. | |
| 2004/0070198 A1 | 4/2004 | Rohrig | |
| 2004/0245766 A1 | 12/2004 | Vallee | |
| 2006/0214422 A1 | 9/2006 | Cuvo | |
| 2007/0001450 A1 | 1/2007 | Swift | |
| 2008/0303274 A1 | 12/2008 | Mazzaferro et al. | |
| 2010/0078934 A1 | 4/2010 | Matsunaga | |
| 2010/0194098 A1 | 8/2010 | Hennemann et al. | |
| 2010/0295299 A1 | 11/2010 | Ziu | |

FOREIGN PATENT DOCUMENTS

| | | |
|---|---|---|
| EP | 0 664 405 1 | 7/1995 |
| EP | 1 669 655 A1 | 6/2006 |
| EP | 1 073 191 A2 | 9/2006 |
| EP | 1 933 074 A2 | 6/2008 |
| FR | 2 810 087 A1 | 12/2001 |
| GB | 4 584 085 | 2/1981 |
| WO | WO 00/57096 | 9/2000 |
| WO | WO 2004/104365 | 12/2004 |

OTHER PUBLICATIONS

Brochure of Sea Tech, Inc. for "10 Series Quick-Connect fittings and values" dated 2008.

Mid-Continent. "PVC Water Well Casings and Screens" brochure, pp. MP00014-MP00017, published Apr. 1975, place of publication—unknown.

VMT Fibreglass Industries, "Glasspoll Fibreglass Reinforced Plastic Pipes and Screens" brochure, pp. 1-4, Jan. 1998, place of publication—unknown.

Eastern District of Pennsylvania, Order construing term "predetermined interior diameter" of U.S. Pat. No. 6,666,480, (Doc. No. 116), p. 1, Oct. 24, 2005, Civil Action No. 03-CV-2131, published on PACER (www.pacer.gov).

Eastern District of Pennsylvania, "Memorandum of Plantiff Certaineed Corporation in Support of Motion for Summary Judgment of Invalidity of the Patent in Suit." (Doc. No. 92), pp. 4-7, 9-12, Sep. 19, 2005, Civil Action No. 03-CV2131, published on PACER (www.pacer.gov).

Mercel Decker, Inc., Thomas Sixsmith, "Handbook of Thermoplastic Piping System Design," pp. 137-141, 1997, ISBN No. 0-8247-9846-5.

CertainTeed Corporation, "KwikSet® Threaded Drop Pipe" brochure, p. 1, 2004, place of publication—unknown.

Eastern District of Pennsylvania, "Memorandum and Order" consuming certain claim terms of U.S. Pat. No. 6,666,480, (Doc. No. 75), pp. 1-9, May 2, 2005, Civil Action No. 03-CV-2131, published on PACER (www.pacer.gov).

Transcript of Nov. 18, 2004, deposition of Northern Products witness Victor Weigel, pp. 40-41, 85-91, Civil Action No. A3-04-18 in the North Dakota District Court, Southeastern Division.

European Patent Office; First Examination Report; Jan. 2, 2013; issued in European Patent Application No. 10 006 705.7.

Canadian Intellectual Property Office; Second Office Action; Jan. 15, 2013; issued in Canadian Patent Application No. 2,708,488.

(56) References Cited

OTHER PUBLICATIONS

European Patent Office, European Application No. 10250176.0, Office Action dated Oct. 27, 2014, 6 pages.
European Patent Office, European Application No. 10006705.7 Office Action dated Jul. 9, 2014, 5 pages.
Transcript of May 12, 2004 deposition of Certainteed Corporation witness John Stoll, pp. 120 and 209-214, Civil Action No. 03-CV-2131 in the United States District Court, Eastern District of Pennsylvania.
International Bureau; Notification Concerning Transmittal of International Preliminary Report on Patentability and International Preliminary Report on Patentability: dated Sep. 15, 2015, for Application No. PCT/US2014/028259, 10 pages.
PCT; Notification of Transmittal of the International Search Report and the Written Opinion of the International Searching Authority, or the Declaration, for PCT/US14/28259, dated Mar. 27, 2015; 16 pages.

* cited by examiner

MALE PUSH LOCK PIPE CONNECTION SYSTEM

RELATED APPLICATIONS

This application is a continuation of U.S. application Ser. No. 12/494,073 filed Jun. 29, 2009, which in turn is a continuation-in-part of prior U.S. patent application Ser. No. 12/365,000 filed Feb. 3, 2009, now U.S. Pat. No. 8,342,579 issued Jan. 1, 2013, each of which is hereby fully incorporated herein by reference.

BACKGROUND OF THE INVENTION

1. Field of the Invention

The present invention relates generally to pipe connections and methods of securely connecting pipes, regardless of the material from which the connecting pipes are manufactured. More specifically, the preferred embodiment of the present invention relates to connection system that uses a plurality of rigid locking fingers extending from the exterior surface of a male end of the pipe and corresponding locking grooves on the interior surface of a female end of the pipe for receiving rigid locking fingers from a connecting length of pipe. The present invention offers a quick connection of two lengths of pipe without gluing, threading, or welding, as well as other advantages described herein. The connection system can be implemented in to lengths of pipe through a manufacturing process so that the end product is an entire product line of pipe that employs the present connection system.

2. Description of the Related Art

In piping systems, there is a variety of ways to connect or join two separate lengths of pipe. In general, connections between two lengths of pipe traditionally have been achieved through one of four ways: (1) gluing or cementing; (2) welding; (3) threading; or (4) external connections such as collars and flanges. In gluing or cementing, an adhesive is applied to the male end, to the female end, or to both ends of the pipes being joined. The male end of one pipe is inserted into the female end of the adjacent pipe being joined and the adhesive cures, permanently joining the pipes. With welding, two metal pipes are joined using molten metal. In threading, the male end of a pipe has external threads and the female end of the adjacent pipe has internal threads. The male end is inserted into the female end of the adjacent pipe, the pipes are rotated, and the threads engage each other. External connections such as collars and flanges can be connected with adhesive, welds, or with threaded fasteners.

Each of the aforementioned connection types has certain disadvantages. For example, a glued or cemented connection can be cumbersome and time consuming. The pipe surfaces must be cleaned and the adhesive applied and allowed to cure before the connection can withstand tensile force. Further, the pipes cannot be disconnected without destruction of at least a portion of the pipe. In threaded connections, the connection can be achieved quicker and the pipes usually can be disconnected and reused, but threaded connections typically cannot withstand high tensile forces. In addition, threaded connections can be cross-threaded relatively easily and require tools to grip, hold, and turn the pipes. Welded connections can withstand significant tensile forces but can only be used on metal pipes. Further, creating the weld is a time-consuming task, and, once the weld is formed it is difficult to remove and may not be possible without pipe destruction. With external connections, the connection often can be removed and can withstand significant tensile forces, but forming the connection is also a time-consuming task.

It is therefore desirable to provide a type of pipe that allows a connection that will withstand large tensile forces and can be quickly formed with similar adjacent pipes without tools. It is also desirable to provide a connection that can be achieved regardless of the material from which the pipe is made.

BRIEF SUMMARY OF THE INVENTION

The pipe of the present invention provides the advantage of a connection that can be quickly formed between pipes of the same or different materials. In addition, the connection formed between two similar, adjacent pipes may have a comparatively high tensile yield strength.

The pipe of the present invention has a female end for receiving a male end of a similar adjacent pipe. The interior surface of the female end has interior circumferential grooves and the exterior surface of the male end has corresponding exterior circumferential grooves. When the male end of the similar adjacent pipe is fully inserted into the female end, rigid fingers extending from the exterior circumferential grooves of the male end are received within the interior circumferential grooves of the female end and prevent the male end from being withdrawn.

The female end of the pipe has a female leading edge and an interior surface, which defines a male end receiving chamber within the female end. The male end receiving chamber will ultimately receive the male end of the similar adjacent pipe. The interior surface of the female end has at least one and preferably a plurality of interior circumferential grooves disposed on it.

The male end of the pipe has a male leading edge, which leads the male end into the male end receiving chamber of the female end of a similar adjacent pipe. The mate end has an outer circumference which is slightly smaller in diameter than the diameter of the male end receiving chamber on the female end. Disposed on the exterior surface of the male end are at least one and preferably a plurality of exterior circumferential grooves. The number of exterior circumferential grooves will typically correspond to the number of interior circumferential grooves disposed on the interior surface of the female end of a similar adjacent pipe.

Rigid fingers extend out from the exterior circumferential grooves of the male end, away from the exterior surface of the male end. Preferably, the rigid fingers extending from each exterior circumferential groove extend from an elastic ring, which is seated within each of the exterior circumferential grooves.

The interior circumferential grooves on the female end are configured to receive the rigid fingers extending from within the exterior circumferential grooves on the male end of a similar adjacent pipe. During insertion of the male end into the male end receiving chamber, the rigid fingers on the male end are displaced in a direction toward the exterior surface of the male end so the male end can be fully inserted in to the female end. When the male end is fully inserted into the male end receiving chamber the rigid fingers extending from the exterior circumferential grooves on the male end are positioned within corresponding interior circumferential grooves on the female end. The rigid fingers and their positioning within the corresponding interior circumferential grooves prevent the male end from being withdrawn.

DETAILED DESCRIPTION OF THE INVENTION

Referring to FIGS. 1-4, the preferred embodiment of the present invention is shown with a pipe 10 and a similar adjacent pipe 12. In practice, the pipe 10 has the same structure as the similar adjacent pipe 12 and therefore, a description of structure that is present for the similar adjacent pipe 12 in the Figures applies equally to a description of the structure for the pipe 10, and vice versa.

Figure 1:
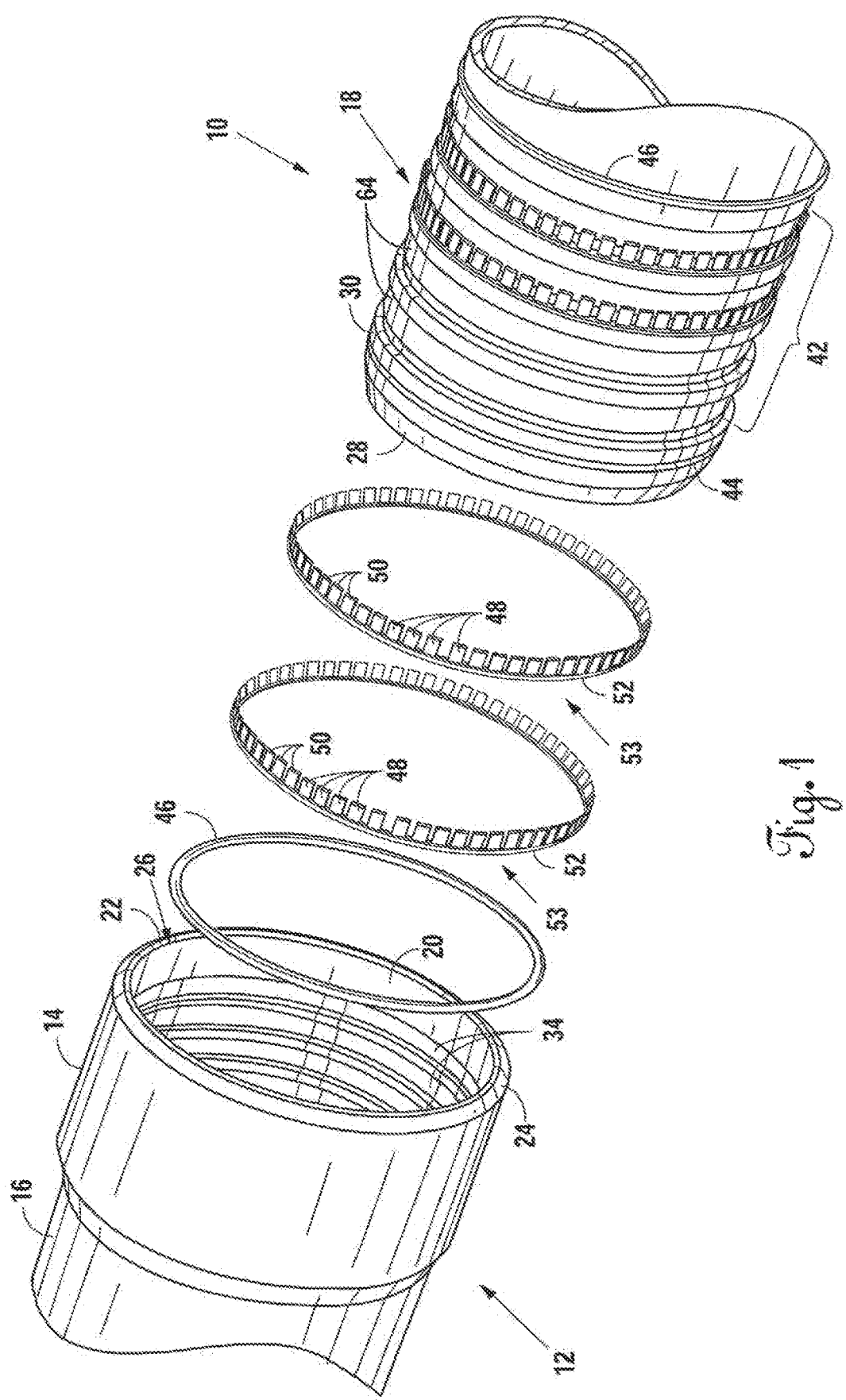
FIG. 1 is an exploded perspective view of the preferred embodiment of the present invention, as shown with the male end of the pipe and the female end of a similar adjacent pipe.
Figure 2:
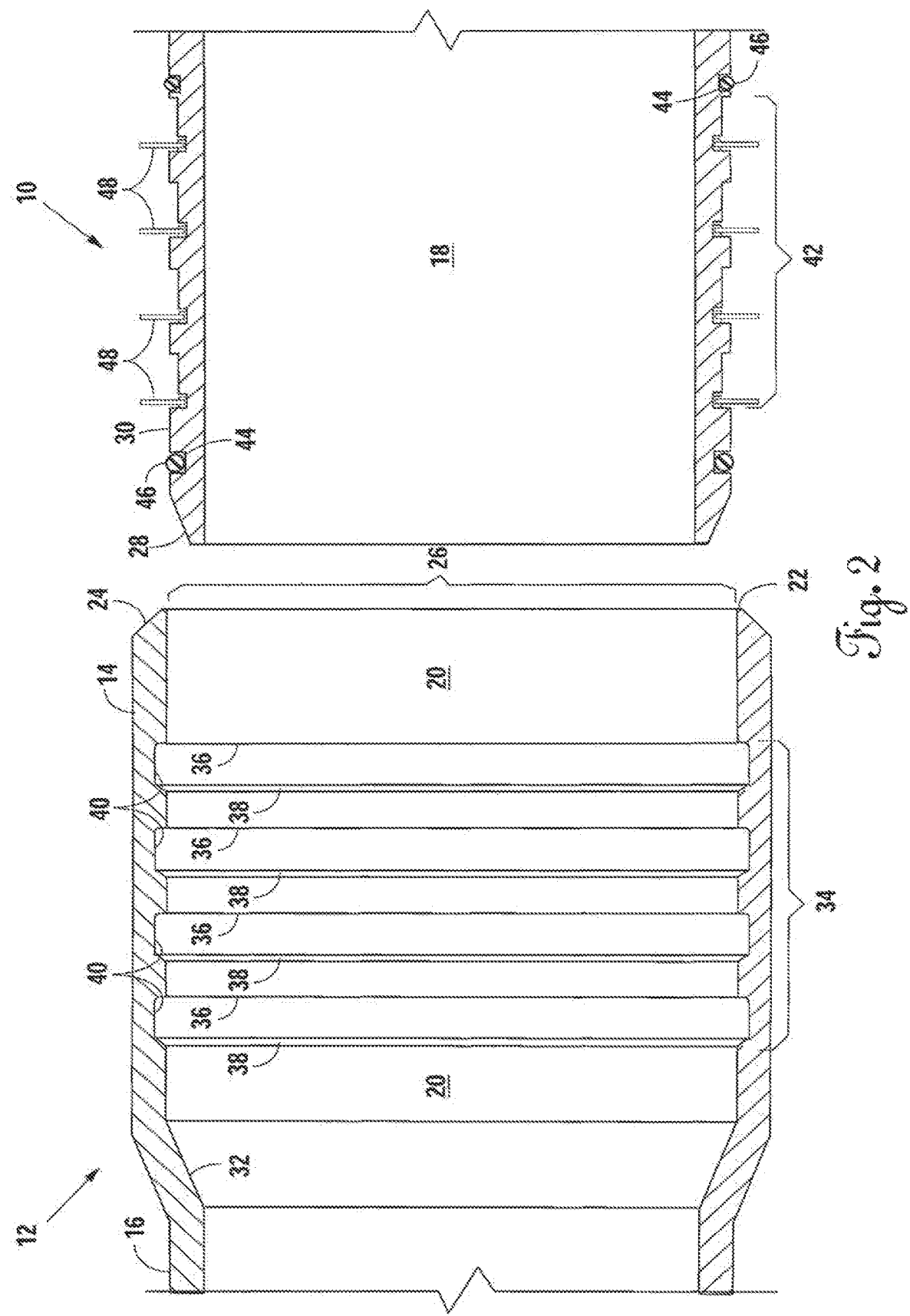
FIG. 2 is a cross sectional side view of the preferred embodiment for the present invention taken along the male end of the pipe and the female end of a similar adjacent pipe.

Pipe 10 has a female end 14, a male end 18, and an intermediate length 16 therebetween. Referring to FIGS. 1 and 2, the female end 14 has an interior surface 20 and a female leading edge 22 that terminates the female end 14. As shown in FIGS. 1-4, the female leading edge 22 has a bevel 24 at the outer diameter of the female end 14 in the preferred embodiment. Alternatively, the female leading edge 22 may have a bevel at the inner diameter of the female end 14 or may not be beveled at all. The interior surface 20 of the female end 14 defines a male end receiving chamber 26, which is essentially the interior space within the female end 14. The male end 18 of the pipe 10 has a male leading edge 28 and an exterior surface 30 with a circumference that is smaller in diameter than the diameter of the male end receiving chamber 26 on the female end 14.

Preferably, the male end receiving chamber 26 will ultimately receive the male end 18 of the similar adjacent pipe 12 with minimal clearance when the pipes are connected and may even create an interference fit; however, it is anticipated that certain applications may require a large clearance between connected pipes. In addition, the pipe 10 is sized according to the outer diameter of its intermediate length 16 and has a tensile yield strength that is largely dependent on the material from which pipe 10 is made.

A stop member 32 is disposed on the pipe 10 preferably at the interior end of the male end receiving chamber 26. In the preferred embodiment, as shown in FIGS. 1-4, the diameter of the male end receiving chamber 26 is larger than the interior diameter of the intermediate length 16. As such, the stop member 32 in the preferred embodiment is a circumferential shoulder formed by the reduction in diameter from the male end receiving chamber 26 to the interior diameter of the intermediate length 16. However, it is anticipated that stop member 32 could be other forms of circumferential shoulders, such as those present in "Flush Mount" connections or a shoulder on the exterior surface 30 of the male end 18. Further, stop member 32 could be other types of structure which limit the amount of insertion of the male end 18 into the female end 14 and which are well known in the art.

Figure 6:
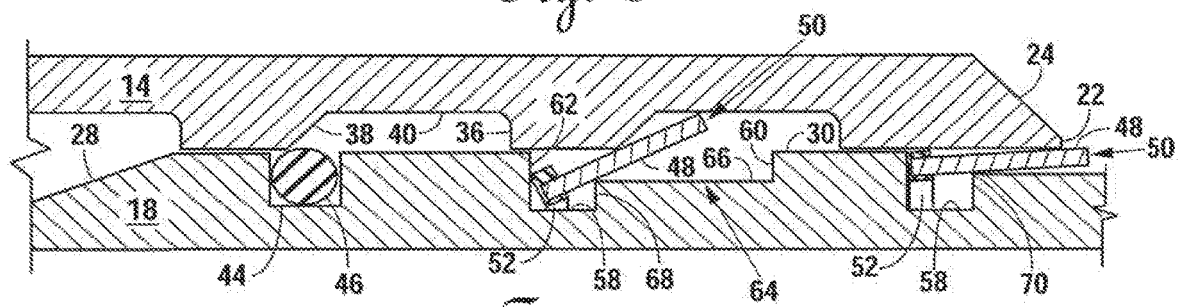
FIG. 6 is a cross sectional view showing a portion of the side profile of the preferred male end at another stage of insertion into the preferred female end of a similar adjacent pipe.
Figure 7:
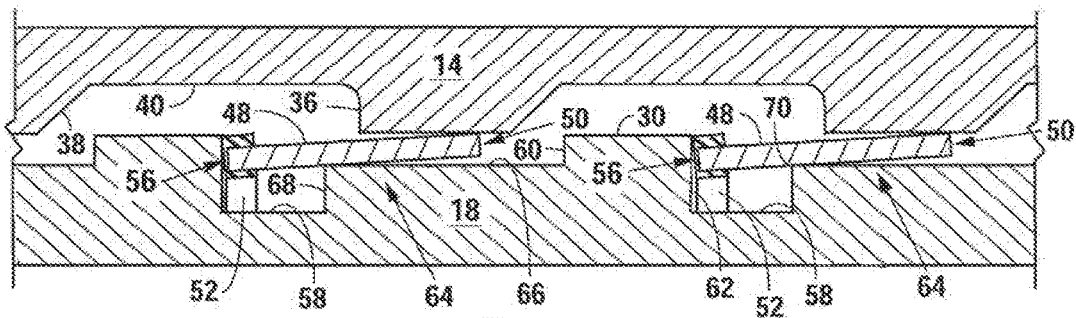
FIG. 7 is a cross sectional view showing a portion of the side profile of the preferred male end at another stage of insertion into the preferred female end of a similar adjacent pipe.
Figure 8:
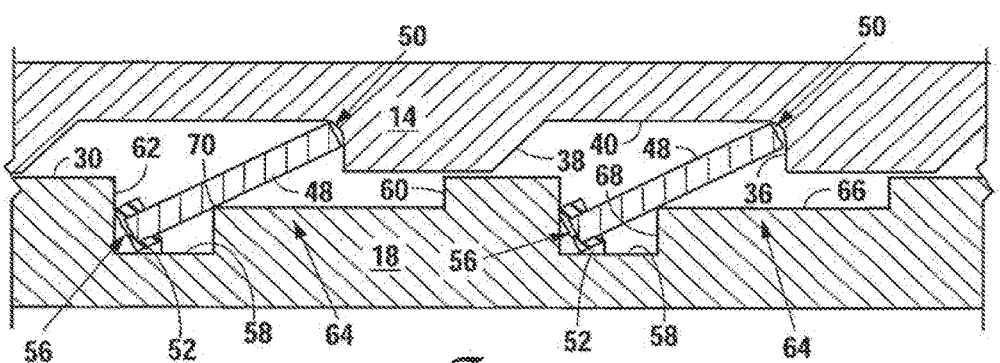
FIG. 8 is a cross sectional view showing a portion of the side profile of the preferred male end fully inserted into the preferred female end of a similar adjacent pipe, with the plurality of rigid fingers being positioned within their corresponding interior circumferential grooves of the female end.
Figure 9:
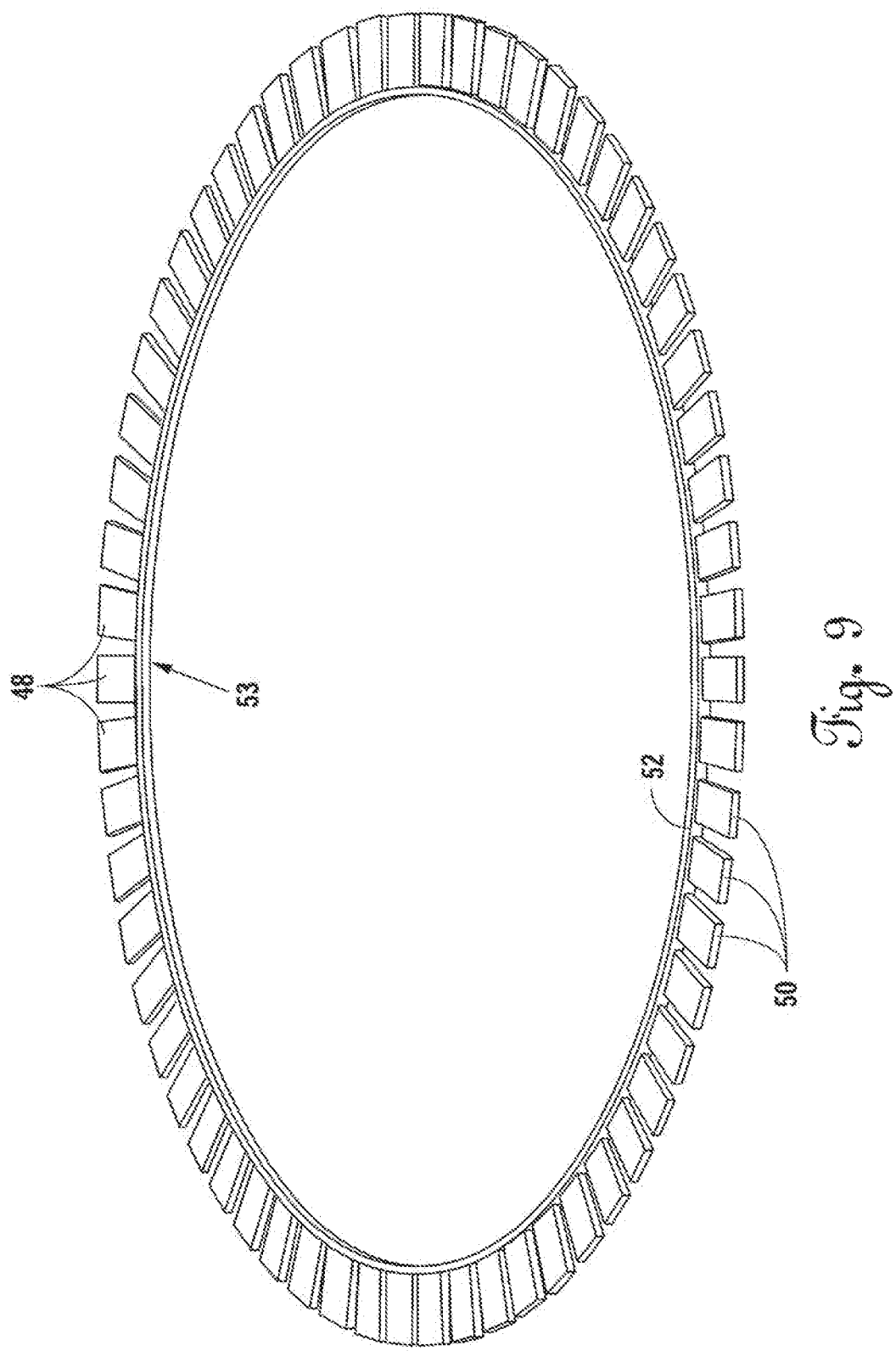
FIG. 9 is a perspective view of the preferred embodiment of the rigid fingers extending from a ring of elastomeric material.

The interior surface 20 of the female end 14 has a plurality of interior circumferential grooves 34 disposed on it. In the preferred embodiment, the number of interior circumferential grooves 34 is four. However, it is anticipated that this number could be more or less, and even as few as one, depending upon the application. As shown in FIGS. 6-8, each of the preferred interior circumferential grooves 34 preferably has a generally trapezoidal cross-section with a first sidewall 36, a second sidewall 38, and a bottom surface 40. Although preferably trapezoidal, it is anticipated that the interior circumferential grooves 34 could have a variety of cross-sections and may not even have the second sidewall 38, as long as the first sidewall 36 and the bottom surface 40 are present.

The first sidewall 36 in each of the interior circumferential grooves 34 is present on the side of the grooves nearest the female leading edge 22. The first sidewall 36 is critical for the present invention to achieve its objectives, as further discussed below. For the time being, it should be noted that in the preferred embodiment, the first sidewall 36 is straight and transverse to the interior surface 20 of the female end 14. Alternatively, the first sidewall 36 could extend from the interior surface 20 of the female end 14 at an angle toward the female leading edge 22. Further, the first sidewall 36 could also be curved in alternative embodiments.

The preferred interior circumferential grooves 34 also have the second sidewall 38 angled away from the female leading edge 22, thereby creating an obtuse angle between the bottom surface 40 and the second sidewall 38. As will be seen, angling the second sidewall 38 away from the female leading edge 22 decreases the amount of insertion force required to insert the male end 18 of the similar adjacent pipe 12 into the female end 14 of the pipe 10.

A plurality of exterior circumferential grooves 42 are disposed on the exterior surface 30 of the male end 18. Preferably, the number of exterior circumferential grooves 42 on the male end 18 will correspond with the number of interior circumferential grooves 34 on the interior surface 20 of the female end 14. Additionally, in the preferred embodiment, at least one circumferential sealing groove 44 with an O-ring 46 seated therein is also disposed on the exterior surface 30 of the male end 18. However, it is anticipated that in certain applications the circumferential sealing groove 44 and the O-ring 46 may be present on the interior surface 20 of the female end 14 or may not be present at all.

A set of rigid fingers 48 extends out from within each of the exterior circumferential grooves 42 and each of the fingers 48 terminates at a distal end 50 (see FIG. 5) which is positioned out of the exterior circumferential grooves 42. Although rigid, each of the rigid fingers 48 is displaceable and the distal end 50 can be radially displaced in a direction toward and away from the exterior surface 30 of the male end 18. Preferably, the rigid fingers 38 are made of stainless steel but any number of substantially rigid materials could be used, depending on the application and the tensile forces involved.

Figure 5:
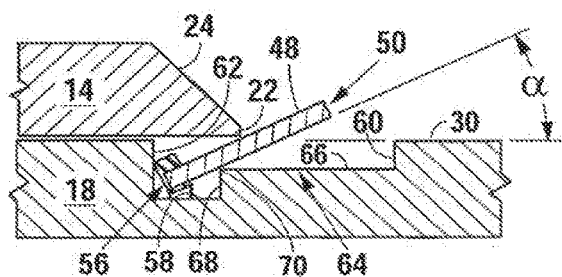
FIG. 5 is a cross sectional view showing the side profile of the preferred exterior circumferential groove on the male end and a finger from the plurality of rigid fingers extending from a ring seated within the groove, at one stage insertion into the preferred female end of a similar adjacent pipe.

The distal end 50 of each of the rigid fingers 48 is biased toward a non-displaced position (as shown in FIG. 5) out of the exterior circumferential grooves 42 unless acted upon by some force. However, each distal end 50 may partially enter into, and perhaps totally enter into, its respective exterior circumferential groove during insertion of the male end 18 of the pipe 10 into the female end 14 of the similar adjacent pipe 12, depending on the amount of clearance between the male end 18 and the female end 14.

In the preferred embodiment, each set of rigid fingers 48 extends from a band 53 that is formed from a continuous length of material and the band 53 has its ends joined so as to form a ring 52 that is seated within each of the exterior circumferential grooves 42 (see FIGS. 9-12). Preferably the ring 52 is elastic, is made from an elastomer, and has a rectangular cross-section profile, and each of the rigid fingers 48 has a proximal end 56 embedded within the ring 52 (see FIGS. 10-12). Being made from an elastomer, the preferred ring 52 can elastically deform and return to its original shape without affecting the integrity of the ring 52. The ring 52 extends circumferentially around the male end 18 of the pipe 10 and is preferably sized such that the ring 52 exerts a radially compressive force on a bottom surface 58 (see FIG. 5) of the exterior circumferential grooves 42. In other words, preferably the diameter of the ring 52 in its non-deformed state is smaller than the outer diameter of the male end 18 at the bottom surface 58 of the exterior circumferential grooves 42.

Figure 13:
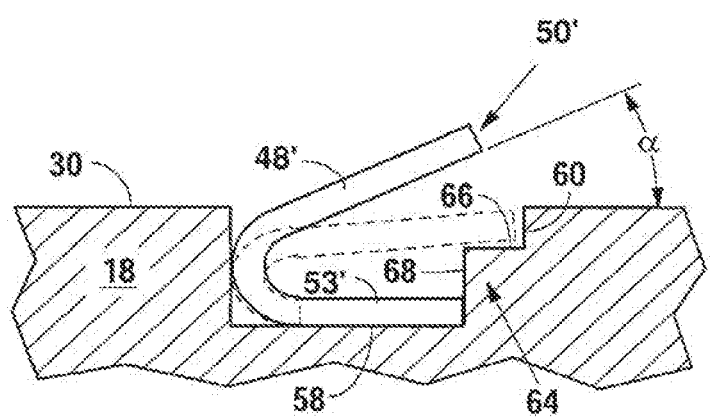
FIG. 13 is a cross sectional view showing the side profile of the preferred exterior circumferential groove on the male end and a finger from the plurality of rigid fingers extending from a band seated within the groove.
Figure 14:
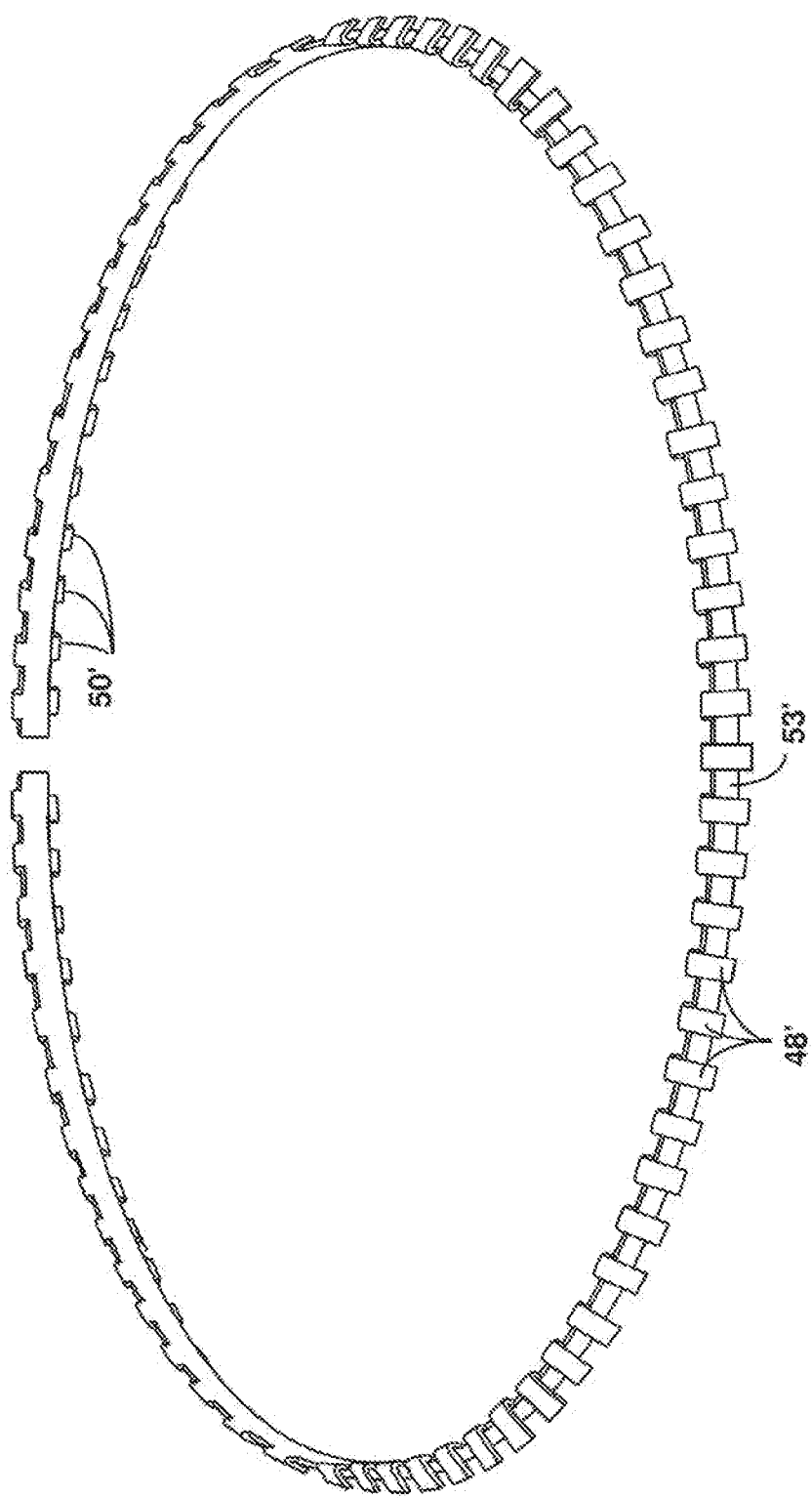
FIG. 14 is a perspective view showing an alternative embodiment of the rigid fingers with the fingers extending from a band.

It is anticipated, however, that the ring 52 may be formed from a material or materials that are not elastomers, or, the band 53 may not have its ends connected so as to form the ring 52. For example, the band 53 may be made from a material such as spring steel with the proximal end 56 of the rigid fingers 48 contiguous with or connected to the band 53. The band 53 would be seated within each of the exterior circumferential grooves 42 such that the rigid fingers 48 would extend out of the exterior circumferential grooves 42, as shown in FIGS. 13 & 14. As shown in FIG. 14, the band 53 in this alternative embodiment would not extend circumferentially around the entire circumference of the male end 18 because the ends of the band 53 are not joined. As a further alternative embodiment, the rigid fingers 48 may extend from a material that partially or completely fills the exterior circumferential grooves 42 (not shown), such that the proximal end 56 of each of the rigid fingers 48 is embedded within the material.

With the rigid fingers 48 extending out of the exterior circumferential grooves 42, an angle α is created between the exterior surface 30 of the male end 18 and each of the rigid fingers 48 (see FIG. 5), before insertion of the male end 18 into the female end 14 of a similar adjacent pipe 12. In the preferred embodiment, the angle α formed between the rigid fingers 48 and the exterior surface is 90°. However, the angle α may differ as between each set of rigid fingers 48 or even as between individual rigid fingers 48 within a single set, depending on the orientation of the elastic ring 52.

FIGS. 5-8 show the preferred embodiment the exterior circumferential grooves 42, which have a generally rectangular cross section profile with a first sidewall 60, a second sidewall 62, the bottom surface 58, and a shoulder 64 positioned in the groove adjacent the first sidewall 60. The shoulder 64 has a top surface 66, a side surface 68, and an edge 70 positioned at the junction between the top surface 66 and the side surface 68.

In the preferred embodiment, the ring 52 is seated between the second sidewall. 62 and the side surface 68 of the shoulder 64 of the exterior circumferential grooves 42. When the male end 18 is inserted into the female end 14 and minimal clearance exists therebetween, the distal end 50 of each of the rigid fingers 48 is temporarily displaced in a direction toward the exterior surface 30 of the male end 18 and the length of the rigid fingers 48 are positioned at least partially, if not totally, in the exterior circumferential grooves 42. In this regard, the distal end 50 of each of the rigid fingers 48 (see FIG. 5) displaces into the space between the top surface 66 of the shoulder 64 and the top edge of the first sidewall 60 of the exterior circumferential grooves 42 (see FIGS. 6 & 7).

Figure 3:
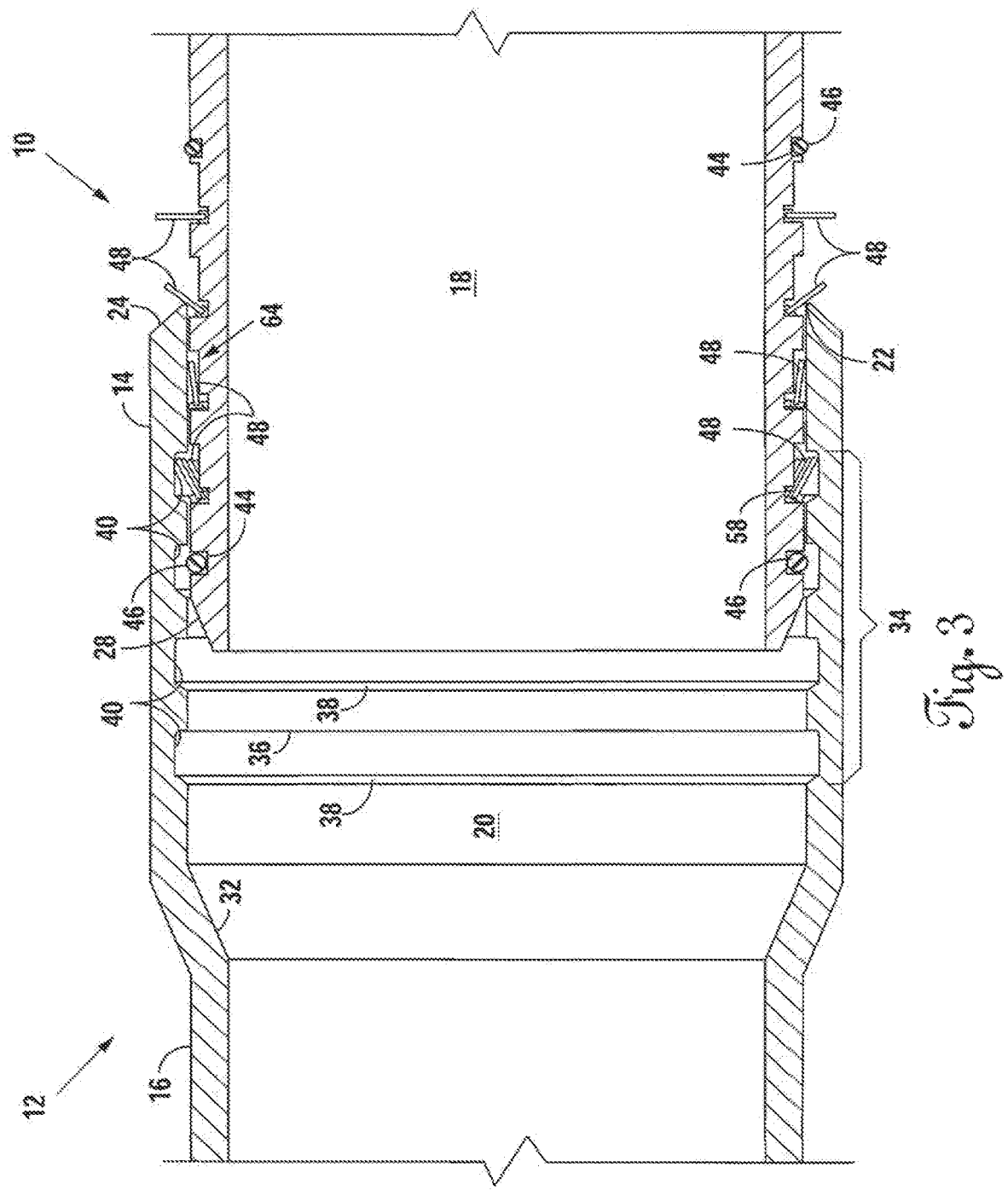
FIG. 3 is a cross sectional side view of the preferred embodiment for the present invention taken along the male end of the pipe and the female end of a similar adjacent pipe, with the male end being partially inserted within the female end.

FIG. 3 shows the male end 18 of the pipe 10 partially inserted into the male end receiving chamber 26 of the female end 14 of the similar adjacent pipe 12. As shown, the male leading edge 28 of the male end 18 is beveled in the preferred embodiment of the pipe 10, with the bevel being set at an approximately 20·radially inward angle with respect to the exterior surface 30 of the male end 18.

Figure 4:
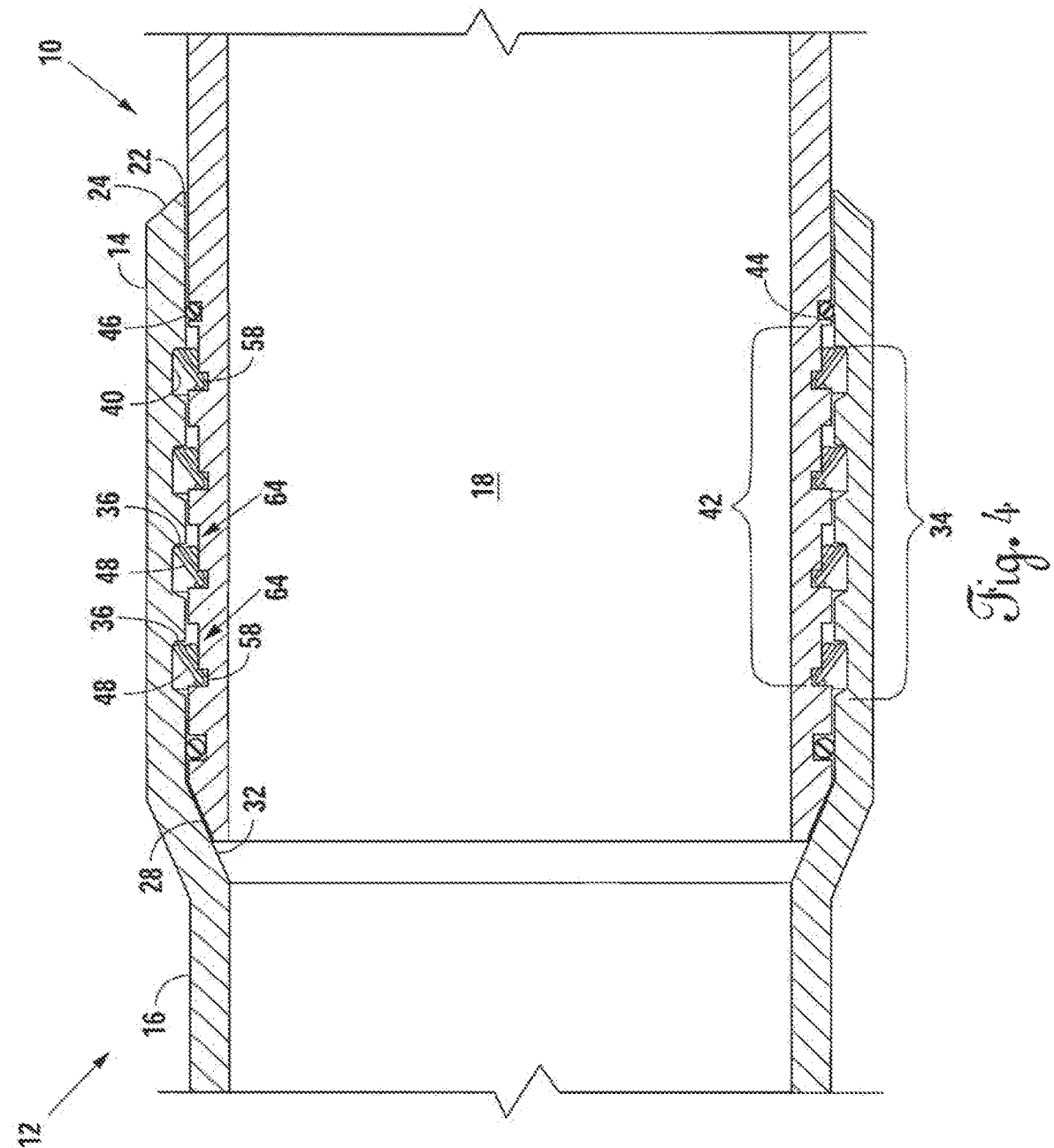
FIG. 4 is a cross sectional side view of the preferred embodiment for the present invention taken along the male end of the pipe and the female end of a similar adjacent pipe, with the male end being fully inserted within the male end receiving chamber and the plurality of rigid fingers being positioned within their corresponding interior circumferential grooves.

As discussed briefly above, the elastic ring 52 may be seated differently from one exterior circumferential groove to another because each ring 52 may have different orientation within each exterior circumferential groove. As a result, the angle α may be different for one set of rigid fingers 48 as compared to another set of rigid fingers 48 prior to insertion of the male end 18 into the female end 14. Further, the angle α may even differ among individual rigid fingers 48 in a single set prior to insertion because the elasticity of the preferred ring 52 of allows the ring 52 to partially rotate, or twist, within a single exterior circumferential groove. However, as the female leading edge 22 of the female end 14 of the similar adjacent pipe 12 contacts the rigid fingers 48 during insertion of the male end 18 of the pipe 10 each of the rigid fingers 48 is caused to rotate clockwise as shown in FIGS. 2-4. It can be appreciated that if the pipes shown were oriented in the opposite direction, the rotation of the rigid fingers 48 would be counterclockwise.

As noted, the female leading edge 22 of the female end 14 preferably has the bevel 24 cut in to its outer diameter, which facilitates proper orientation of each of the rigid fingers 48 when the male end 18 of the pipe 10 is inserted into the female end 14 of the similar adjacent pipe 12. The bevel 24 allows the female leading edge 22 of the similar adjacent pipe 12 to slide under any of the rigid fingers 48 oriented such that their distal end 50 faces toward the male leading edge 28 of the pipe 10. With the bevel 24 under the rigid fingers 48, the female end 14 of the similar adjacent pipe 12 lifts the distal end 50 and rotates the rigid fingers 48 clockwise, displacing the distal end 50 of each of the rigid fingers 48 away from the male leading edge 28 of the pipe 10. Preferably, the bevel 24 is set at an approximately 45° radially inward angle with respect to the exterior surface of the female end 14.

As the male end 18 is inserted in to the male end receiving chamber 26, the interior surface 20 of the female end 14 contacts the sets of rigid fingers 48 and causes the distal end 50 of the rigid fingers 48 to be displaced toward the exterior surface 30 of the mal e end 18 (see FIGS. 6 & 7). In the preferred embodiment, the rigid fingers 48 contact the edge 70 of the shoulder 64 in the exterior circumferential grooves 42. Once the rigid fingers 48 contact the edge 70 of the shoulder 64, the edge 70 acts as a fulcrum causing further clockwise rotation of the rigid fingers 48 around the edge 70 and causing the distal end 50 of each of the rigid fingers 48 to displace toward the exterior surface 30 of the male end 18. Meanwhile, rotation of the rigid fingers 48 causes the proximal end 56 of each of the rigid fingers 48 to lift the elastic ring 52 from the bottom surface 58 of the exterior circumferential grooves 42 and displace it in a direction away from the bottom surface 58, and, thereby elastically deforming the elastic ring 52 (see FIG. 7).

The now elastically deformed ring 52, as shown in FIG. 7, will try to return to its original resting position prior to insertion of the male end 18 of the pipe into the female end 14 of the similar adjacent pipe 12, as shown in FIG. 2. Thus, the elastic ring 52 exerts a radially inward force on the proximal end 56 of each of the rigid fingers 48, effectively pulling or biasing each proximal end 56 of the rigid fingers 48 toward the bottom surface 58 of the exterior circumferential grooves 42.

FIG. 4 shows the male end 18 of the pipe 10 fully inserted into the male end receiving chamber 26 on the female end 14 of the similar adjacent pipe 12. When fully inserted, the male leading edge 28 of the male end 18 abuts the stop member 32 and male end 18 of the pipe 10 is prevented from further insertion into the similar adjacent pipe 12.

With the male end 18 fully inserted into the female end 14 the sets of rigid fingers 48 are positioned over their corresponding interior circumferential grooves 34 on the female end 14 of a similar adjacent pipe 12. The pulling or biasing force described above causes the rigid fingers 48 to rotate counterclockwise about the edge 70 of the shoulder 64, displacing the distal end 50 of each of the rigid fingers 48 toward the corresponding interior circumferential grooves 34. In this manner, the distal end 50 of each of the rigid fingers 48 is received within the corresponding interior circumferential grooves 34 on the interior surface 20 of the female end 14 (see FIG. 8). As noted, in the preferred embodiment the pulling or biasing force is caused by the preferred elastic ring 52 pulling the proximal end 56 of each of the rigid fingers 48 back toward the bottom surface 58 of the exterior circumferential grooves 42.

Preferably, a set of rigid fingers 48 becomes positioned within each interior circumferential groove such that the distal end 50 (see FIG. 5) of each of the rigid fingers 48 abuts the first sidewall 36 of the interior circumferential grooves 34; however, it is anticipated that abutment may not be achieved until tensile forces are applied to the connection between the pipe 10 and the similar adjacent pipe 12. The abutment of each distal end 50 of the rigid fingers 48 against the first sidewall 36 prevents withdrawal of the male end 18 of the pipe 10 out of the male end receiving chamber 26 of the female end 14 of the similar adjacent pipe 12, thereby locking the pipe 10 and the similar adjacent pipe 12 together.

Figure 10:
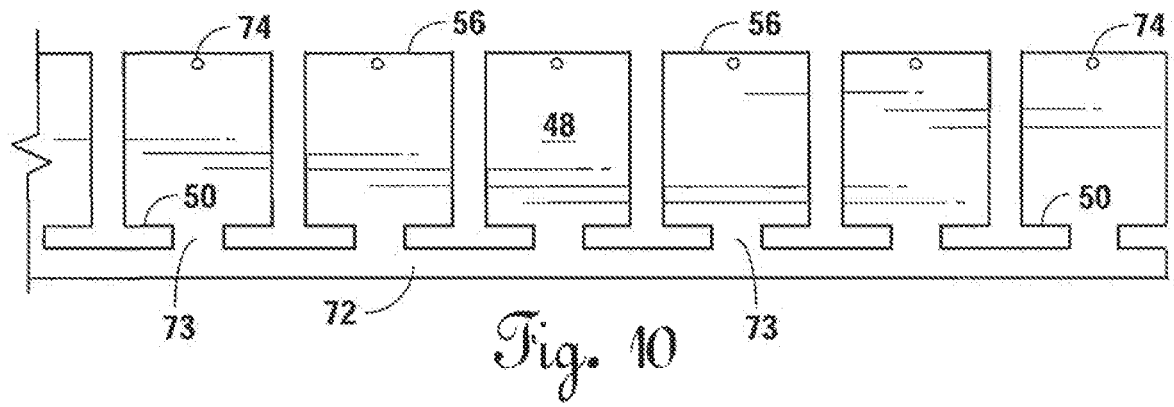
FIG. 10 is a side view of a portion of the preferred rigid fingers during a manufacturing stage that is prior to the strip of elastomeric material being deposited on the proximal end of the fingers, with a band extending between the distal ends of the rigid fingers.
Figure 11:
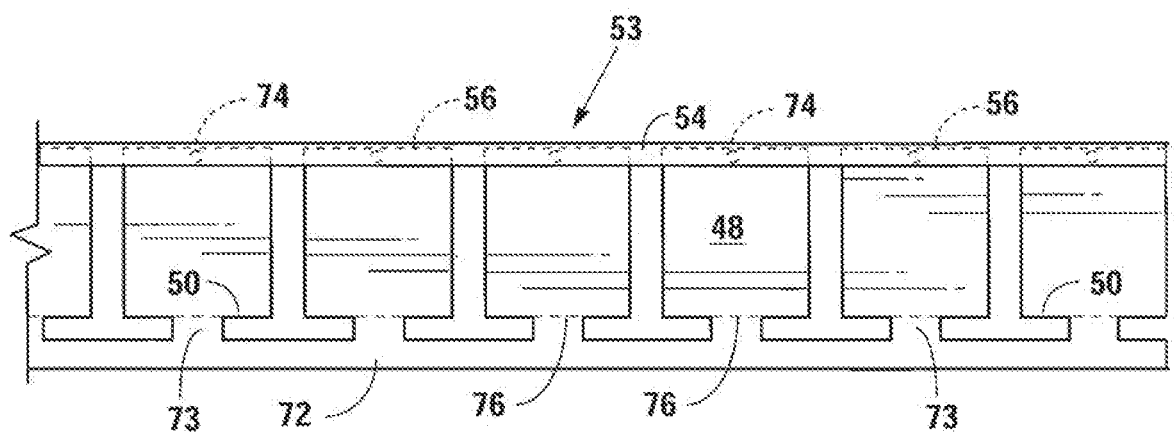
FIG. 11 is a side view of a portion of the preferred rigid fingers during a manufacturing stage after the strip of elastomeric material is deposited on the proximal end of the fingers.
Figure 12:
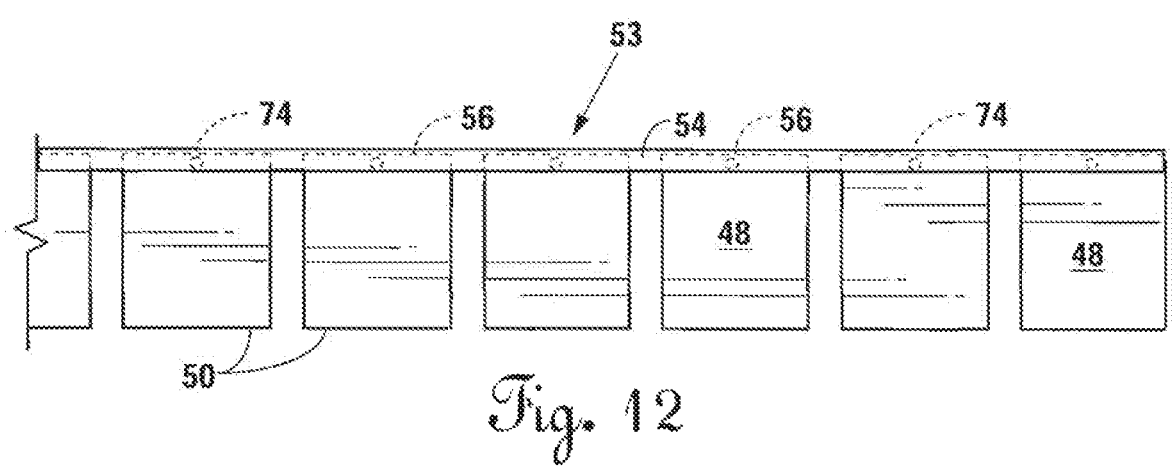
FIG. 12 is a side view of a portion of the preferred rigid fingers during the final manufacturing stage after the strip of elastomeric material is deposited on the proximal end of the fingers and the band extending between the rigid fingers has been removed.

FIGS. 10-12 show various manufacturing stages for the preferred embodiment of a portion of a set of rigid fingers 48 before the ends of the band 53 have been joined and the ring 52 is formed. FIG. 10 shows the rigid fingers 48 before the band 53 of an elastomeric material 54 is molded around the proximal end 56 of each of the rigid fingers 48. As shown, a holding band 72 has tabs 73 which connect to each of the distal ends of the rigid fingers 48. The holding band 72, tabs 73, and the rigid fingers 48 are made from the same integral piece of rigid material, which has been stamped out, cut by a water jet, or otherwise formed from manufacturing processes that are well known in the art. Further, a hole 74 is stamped, cut, or otherwise formed in the proximal end 56 of each of the rigid fingers 48 from manufacturing processes that are well known in the art.

After the rigid fingers 48, the holding band 72, and the hole 74 are formed, the elastomeric material 54 is deposited to surround the proximal end 56 of the rigid fingers 48 (see FIG. 11). Preferably, the proximal end 56 of the rigid fingers 48 is inserted into a rectangular mold (not shown) and the elastomeric material 54 is injected into the mold. Preferably, the elastomeric material 54 flows around the proximal end 56 and through the hole 74 of each of the rigid fingers 48 during injection, thereby allowing a mechanical connection to be formed between the rigid fingers 48 and the elastomeric material 54. Alternatively, a chemical bond (not shown) could be formed between the elastomeric material 54 and the rigid fingers 48, which results from bonding processes well known in the art.

Once injected, the elastomeric material 54 is then allowed to cure and preferably undergoes vulcanization processes as part of the curing. Once fully cured, the rectangular mold is removed from around the now band 53 of elastomeric material 54. After the rectangular mold (not shown) is removed, the holding band 72 and the tabs 73 are removed, preferably by cutting along the dotted line 76 at the distal end 50 of each of the rigid fingers 48, as shown in FIG. 11. FIG. 12 shows the rigid fingers 48 after the holding band 72 has been removed. Once the holding band 72 is removed, the ends of the band 53 of elastomeric material 54 are joined, thereby creating the preferred elastic ring 52 of elastomeric material 54.

The number, shape, and size of rigid fingers 48 in each set of rigid fingers 48 is a design choice that depends on the application of the invention. With a 4" Nominal Pipe Size Schedule 40 PVC pipe, the preferred embodiment of the present invention has fifty-eight (58) stainless steel fingers in each set, with one set per exterior circumferential groove. Each of the rigid fingers 48 is 0.180 inches wide, 0.300 inches long, and 0.030 thick, prior to depositing the elastomeric material 54. Further, the sets of rigid fingers 48 have a 0.060 inch gap between each finger. As mentioned, the ring 52 preferably has a rectangular cross section, which is approximately, 0.040 inches high and 0.060 inches long prior to deformation. The pre-deformation circumference of the ring 52 varies, depending on the type of material from which it is made.

In the preferred embodiment, the amount of insertion force required to insert the male end 18 into the female end 14 can be varied by altering a number of factors. As noted, the ring 52 preferably is seated between the second sidewall 62 of the exterior circumferential grooves 42 and the side surface 68 of the shoulder 64. Altering the distance between the second sidewall 62 and the side surface 68 of the shoulder 64 will increase or decrease the amount of insertion force required. Other ways to alter the insertion force are to vary the length of the rigid fingers 48 or alter the length of the side surface 68 of the shoulder 68. In addition, the insertion force is reduced by the angled second sidewall 38 of the preferred interior circumferential grooves 34.

Another way to increase or decrease the amount of insertion force is by varying the hardness, or durometer, of the elastomeric material 54 of the ring 52. The softer the durometer of the material chosen for the ring 52, the easier it is for the ring 52 to elastically deform. Preferably, the elastomeric material 54 is a polymer such as Viton® or Buna-N (AKA Nitrile) having a "40 Shore N' durometer rating. Viton® and Buna-N (AKA Nitrile) are materials commonly used in o-rings for pipes and the materials are compatible in environments where the pipe 10 is continuously exposed to water. However, EPDM rubber or other types of material may be used, depending on the application and the environments encountered by the ring 52.

Although the present invention has been described with reference to specific embodiments, this description is not meant to be construed in a limiting sense. Various modifications of the disclosed embodiments, as well as alternative embodiments of the invention will become apparent to persons skilled in the art upon the reference to the above-description of the invention. It is, therefore, contemplated that the appended claims will cover such modifications that fall within the scope of the invention.

The invention claimed is:

1. A method of connecting a male end of a pipe to a female end of an adjacent pipe comprising:
    extending a first plurality of rigid fingers from at least one elastic band, having its ends joined to form a ring, seated within at least one exterior circumferential groove on the exterior surface of said male end of said pipe, said at least one exterior circumferential groove having a first exterior sidewall, a second exterior sidewall, a bottom exterior surface, and a shoulder, said first plurality of rigid fingers being displaceable and having opposed distal and proximal ends, said proximal ends being embedded within said at least one elastic band and positioned proximal to said second exterior sidewall, wherein the first plurality of rigid fingers is displaceable and configured to rotate about said shoulder of said at least one exterior circumferential groove when said first plurality of rigid fingers are in contact with said shoulder of said at least one exterior circumferential groove and their proximal ends when said first plurality of rigid fingers are not in contact with said shoulder of said at least one exterior circumferential groove;
    receiving a portion of said male end of said pipe within a male end receiving chamber on said female end of said adjacent pipe;
    engaging said first plurality of rigid fingers with said female end of said adjacent pipe;
    contacting said first plurality of rigid fingers with said shoulder of said at least one exterior circumferential groove;
    displacing said first plurality of rigid fingers toward the exterior surface of said male end of said pipe, said plurality of first rigid fingers being otherwise biased towards a non-displaced position by said at least one elastic band, wherein said displacement causes said proximal ends of the first plurality of rigid fingers to lift the elastic band away from the bottom surface of the at least one exterior circumferential groove and elastically deform the elastic band such that the elastic band exerts a radial force on the proximal ends of the first plurality of rigid fingers;
    positioning at least one interior circumferential groove, having a first interior sidewall, a second interior sidewall, and a bottom interior surface, on said female end with respect to said first plurality of rigid fingers, said interior circumferential groove being sized and positioned to receive a second plurality of rigid fingers, wherein said second plurality of rigid fingers have opposed distal and proximal ends, said proximal ends being positioned proximal to a corresponding second sidewall of said at least one exterior circumferential groove of said male end;
    receiving said second plurality of rigid fingers into said at least one interior circumferential groove on said female end such that said distal end of each of said second plurality of rigid fingers is positioned proximal to said first interior sidewall of said at least one internal circumferential groove of said female end;
    preventing said male end of said pipe from inserting further into said adjacent pipe; and,
    preventing said male end of said pipe from being withdrawn from said female end of said adjacent pipe.

2. A method of connecting a male end of a pipe to a female end of a similar adjacent pipe as recited in claim 1 wherein said step of preventing said male end of said pipe from inserting further into said pipe further comprises engaging said male end of said pipe with a stop member positioned on the interior surface of said female end of said similar adjacent pipe.

3. A method of connecting a male end of a pipe to a female end of a similar adjacent pipe as recited in claim 1 wherein said step of preventing said male end of said pipe from being withdrawn from said female end of said similar adjacent pipe further comprises engaging distal ends of said second plurality of rigid fingers against a sidewall of said at least one interior circumferential groove of said female end.

4. A method of connecting a male end of a pipe to a female end of a similar adjacent pipe as recited in claim 1 wherein said step of extending said first plurality of rigid fingers from within and out of at least one exterior circumferential groove on the exterior surface of said male end of said pipe further comprises:

extending said first plurality of fingers from an elastic ring; and, seating said ring within said exterior circumferential groove of said male end.

5. A method of connecting a male end of a pipe to a female end of a similar adjacent pipe as recited in claim 4 wherein said step of engaging said first plurality of rigid fingers with said female end of said similar adjacent pipe further comprises:

contacting said first plurality of rigid fingers with a female leading edge of said female end of said similar adjacent pipe; and, orienting the distal end of said first plurality of rigid fingers away from a male leading edge of said male end of said pipe.

6. A method of connecting a male end of a pipe to a female end of a similar adjacent pipe as recited in claim 4 wherein said step of displacing said first plurality of rigid fingers toward the exterior surface of said male end of said pipe further comprises:

leveraging said first plurality of rigid fingers against a shoulder positioned within said at least one exterior circumferential groove; and, elastically deforming said elastic ring.

7. A method of connecting a male end of a pipe to a female end of a similar adjacent pipe as recited in claim 6 wherein said step of receiving said second plurality of rigid fingers into said at least one interior circumferential groove on said female end further comprises:

returning said elastic ring close to, if not completely to, its resting size within said at least one exterior circumferential groove on said male end.

8. A method of connecting a female end of a pipe to a male end of a similar adjacent pipe as recited in claim 1 wherein said step of extending said second plurality of rigid fingers from at least one interior circumferential groove on the interior surface of said female end of said pipe into a male end receiving chamber of said female end further comprises:

extending said second plurality of fingers from a band; and, seating said band within said interior circumferential groove of said female end.

9. A method of connecting a male end of a pipe to a female end of an adjacent pipe comprising:

aligning the male end of the pipe with the female end of the adjacent pipe, both male and female pipe ends of each pipe including at least one circumferential groove, wherein the at least one circumferential groove is on the exterior of the male end of the pipe and is on the interior of the female end of the adjacent pipe, the at least one circumferential groove on the male end of the pipe including at least one band adjacent to a bottom surface of the at least one circumferential groove, the at least one band having its ends joined to form a ring and having a plurality of rigid fingers, wherein the plurality of rigid fingers have proximal ends embedded within the ring and opposed distal ends, the plurality of rigid fingers being displaceable and biased towards a non-displaced position by the at least one band, wherein the displacement of the rigid fingers comprises;

inserting the male end of the pipe into the female end of the adjacent pipe, including:

displacing the plurality of rigid fingers against an interior body of the female pipe, aligning the at least one circumferential groove on the exterior of the male end of the pipe with the at least one circumferential groove on the interior of the female end of the pipe, such that the distal ends of the plurality of rigid fingers extend into the at least one circumferential groove on the interior of the female end of the adjacent pipe and the proximal ends lift the band away from the bottom surface of the at least one circumferential groove on the exterior of the male end of the pipe such that the band is adjacent to a sidewall of the at least one circumferential groove on the exterior of the male end of the pipe, and preventing the male end of the pipe from being withdrawn from the female end of the adjacent pipe by bracing the distal ends of the plurality of rigid fingers against a sidewall of the at least one circumferential groove on the interior of the female end of the adjacent pipe.

10. A method of connecting a male end of a pipe to a female end of an adjacent pipe as recited in claim 9 wherein the step of inserting the male end of the pipe into the female end of the adjacent pipe further comprises:

preventing the male end of the pipe from inserting further into the female end of the adjacent pipe by engaging the male end of the pipe with a stop member positioned on the interior surface of the female end of the adjacent pipe.

11. A method of connecting a male end of a pipe to a female end of an adjacent pipe as recited in claim 9 wherein the step of inserting the male end of the pipe into the female end of the adjacent pipe further comprises:

leveraging the plurality of rigid fingers against a shoulder positioned within said at least one exterior circumferential groove; and, elastically deforming the at least one band.

12. A method of connecting a male end of a pipe to a female end of an adjacent pipe as recited in claim 11 wherein the step of inserting the male end of the pipe into the female end of the adjacent pipe further comprises:

returning the at least one band close to, if not completely to, its resting size within the at least one circumferential groove on the male end of the pipe.

13. A method of connecting a male end of a pipe to a female end of an adjacent pipe as recited in claim 9 wherein the at least one band is within the at least one circumferential groove of the female end of the adjacent pipe rather than at least one circumferential groove of the male end of the pipe.

* * * * *